United States Patent [19]

Breitmeier

[11] Patent Number: 4,948,984
[45] Date of Patent: Aug. 14, 1990

[54] OPTICAL SCANNING HEAD WITH OBJECTIVE POSITION MEASURING AND MIRRORS

[75] Inventor: Ulrich O. Breitmeier, Stuttgart, Fed. Rep. of Germany

[73] Assignee: Focus MeBtechnik GmbH & Co KG, Stuttgart, Fed. Rep. of Germany

[21] Appl. No.: 328,587

[22] PCT Filed: Jul. 14, 1988

[86] PCT No.: PCT/EP88/00527
§ 371 Date: Feb. 14, 1989
§ 102(e) Date: Feb. 14, 1989

[87] PCT Pub. No.: WO88/10405
PCT Pub. Date: Dec. 29, 1988

[30] Foreign Application Priority Data

Jun. 16, 1987 [DE] Fed. Rep. of Germany ....... 3720079

[51] Int. Cl.$^5$ .................. G01N 21/86; G01J 1/20; H01J 3/14
[52] U.S. Cl. ..................... 250/560; 250/201.4; 250/216
[58] Field of Search ............... 250/226, 201, 560, 561, 250/227, 216, 201.4, 201.5, 201.3; 369/44, 45, 46; 356/375, 376, 5

[56] References Cited

U.S. PATENT DOCUMENTS

| | | | |
|---|---|---|---|
| 4,433,235 | 2/1984 | Akiyama et al. | 250/201 |
| 4,563,058 | 1/1986 | Yardy | 369/45 |
| 4,595,829 | 6/1986 | Neümann et al. | 250/201 |
| 4,611,115 | 9/1986 | Rich | 250/216 |
| 4,680,745 | 7/1987 | Ota et al. | 250/201 |
| 4,734,570 | 3/1988 | Horikawa et al. | 250/201 |

Primary Examiner—David C. Nelms
Assistant Examiner—Michael Messinger
Attorney, Agent, or Firm—Fred Philpitt

[57] ABSTRACT

An optical scanning head (10) for measuring the surface of a work-piece (12) contains an integrated microscope. For this purpose, a deflecting mirror (38) located in the wall of the housing (14) of the scanning head is constructed as a dielectric mirror, which is impermeable for measured light, on the other hand is permeable for observation light and is also machined to optical quality on its rear side. Seated behind this deflecting mirror (38) are a tube lens (70) and an ocular lens (72), which together with the objective (24) of the scanning head (10) form a microscope.

9 Claims, 2 Drawing Sheets

OPTICAL SCANNING HEAD WITH OBJECTIVE POSITION MEASURING AND MIRRORS

Optical scanning heads according to this invention are intended for incorporation in CD-players and serve for reading the optical information stored on the CD (compact disc). Due to the fact that the measuring light source is not located on the objective axis, on the contrary on an axis at right angles thereto and the measuring light is focussed by way of a deflecting mirror from the measuring light source by way of the objective on the surface to be scanned, one obtains a particularly low overall height of the scanning head, which makes it possible to produce CD-players with such a low overall height that they correspond to the standard dimensions of car radios.

This type of construction of the scanning head has the further advantage, which is not relevant for use in motor vehicle CD-players, that the path of rays between the measuring light source and objective is accessible for manipulations, since the deflecting mirror is inserted in an opening in the housing of the scanning head.

It was already proposed (DE-OS 35 36 700), to use such scanning heads of CD-players also for the high resolution measurement of the profiling and of the surface roughness of work-piece surfaces. In this case it would occasionally be advantageous if one could also visually inspect the surface section just measured.

It was then recognised that by slightly varying the deflection mirror on an optical scanning head, such as is used in motor vehicle CD-players at very low costs one could provide the additional possibility of direct observation of the point of the work-piece surface just measured.

For this purpose, it is proposed according to the invention to use a deflection mirror, which is indeed impermeable to the measured light, but is permeable for at least one wavelength in the visible region of the spectrum and has optical quality not solely on the reflecting front side, but also on its rear side. One can then position an observation device directly behind this deflecting mirror. Since the deflecting mirror is frequently originally a dielectric mirror, thus comprises a basic member (generally of glass) permeable to visible light, in many cases it is sufficient to remove the easily accessible deflecting mirror, already located on the scanning head intended for CD-players, to additionally polish it to optical quality on its rear side and then to re-install it. The observation optical system may be a commercially available microscope-eye-piece.

The modification according to the invention of the optical scanning head thus allows a visual observation of the respectively measured point of the work-piece surface, with very low additional costs. The additionally provided optical parts do not need to be manufactured specially, they do not require a great deal of space and do not considerably increase the weight of the scanning head.

Since the objectives used in CD-scanning heads have a very short focal length (in practice 4.5 mm) and also have a small diameter (in practice 6–8 mm), these objectives correspond very closely to microscope objectives. Thus, together with a commercially available microscope-eye-piece, according to the invention one obtains a microscope integrated in the scanning head.

With the development another embodiment of the invention a visual inspection of the measuring point is then possible even if the ambient light is very poor and the scanning head casts shadows. The observation device containing the scanning head and illumination device forms a compact, smooth-surfaced unit. Furthermore, the observation light falls exactly onto the measuring point, so that the illumination device requires only low power.

The development of the invention according to another embodiment is an advantage with regard to a solely low overall height even of the modified scanning head.

The development of the invention according to another embodiment ensures that one can carry out the visual observation of a point of the work-piece surface and the measurement of this point simultaneously, without the measurement result being adulterated and indeed even if the photoelectric transducer arrangement is sensitive per se to visible light, as is generally the case.

It is frequently necessary to measure work-piece surfaces at points which are not easily accessible and in this case the development of the invention according to another embodiment facilitates the visual inspection with the microscope integrated in the scanning head in a manner which is not tiring for the operator. Very compact solid state image converters with extremely good resolution can be obtained at relatively low prices as a vidicon replacement in television cameras. They can be connected simply to a monitor by way of the electronics developed for this camera.

The development of the invention according to another embodiment is an advantage with regard to the simple equipping of such scanning heads, which originally offer no possibility for direct observation of the measuring point.

The development of the invention according to another embodiment facilitates convenient observation of the measuring point from a distance.

With the development according to another embodiment it is ensured that the observation light source can be separated spatially from the scanning head, which is an advantage with regard to protection from heat, without additional measures as regards apparatus having to be taken for guiding the observation light to the measuring point.

The invention is described in detail hereafter by means of two embodiments, referring to the drawings, in which:

DESCRIPTION OF PREFERRED EMBODIMENTS

Figure 1:
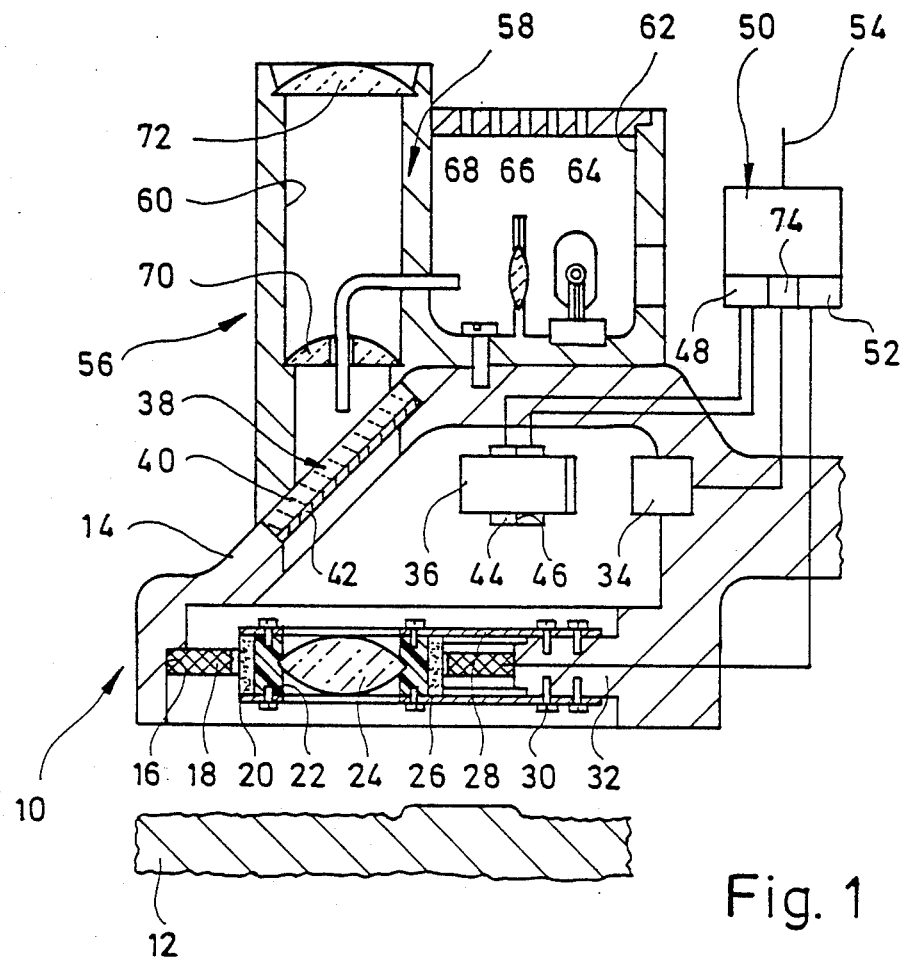
FIG. 1 is a diagrammatic, vertical section through an optical scanning head for the high-resolution measuring of a work-piece surface.

In FIG. 1, a scanning head is designated generally by the reference numeral 10, which serves for the high accuracy measurement of surface roughnesses and surface structures on the surface of a work-piece 12.

The scanning head 10 has a housing 14, which is substantially cup-shaped. Securely inserted in a lower opening 16 in the housing 14 is a toroidal coil 18, which produces an axial magnetic field. The toroidal coil 18 co-operates with an annular permanent magnet 20, which is stuck to the outside of an objective ring 22. The objective ring 22 retains an objective 24. The unit formed by the permanent magnet 20, the objective ring 22 and the objective 24 penetrates the toroidal coil 18 with radial clearance and is supported by two leaf springs 26, 28 extending parallel to each other, the section of which located on the left in FIG. 1 is constructed in the form of spectacles, so that the objective 24 remains free, whereas the section located on the right-hand side is in the form of a strip and is fixed at its outermost end by screws 30 to a cross-piece 32 of the housing 14. The leaf springs 26, 28 thus form a resilient parallelogram suspension for the objective 24.

Fixed in the section of the peripheral wall of the housing 14 located on the right in FIG. 1 is a semi-conductor laser 34 operating in the red. The laser beam emitted by the latter penetrates a semi-permeable measuring mirror 36 and reaches a deflecting mirror 38. The latter consists of a glass backing member 40 and a dielectric layer 42 applied to its under side, which is chosen so that the deflecting mirror 38 reflects the laser beam. The latter then passes through the objective 24 and is focussed by the latter on the surface of the workpiece 12.

The laser light reflected by the work-piece surface is focussed by the objective 24 and passes by way of the deflecting mirror 38 back to the measuring mirror 36. The latter separates part of the reflected measuring light and directs it to a photoelectric transducer arrangement 44, the centre of which is indicated at 46. The photoelectric transducer arrangement 44 produces an output signal, which depends on the position of the incident light with regard to the centre line 46. This output signal passes to an input amplifier 48 of an operating circuit associated with the scanning head 10 and designated generally by the reference numeral 50.

The operating circuit 50 contains switching circuits not shown in detail, which ascertain the deviation of the instantaneously obtained output signal of the transducer arrangement 44 from that signal which is obtained at the time of incidence of the measuring light upon the centre line 46. Corresponding to the difference between these two signals, the operating circuit 50 produces a fault signal for a power amplifier 52, which supplies the toroidal coil 18. The feed current for the toroidal coil 18 is increased or reduced until the measuring light spot on the transducer arrangement 44 again lies on the centre line 46. This is the case when the distance between the objective 24 and the illuminated point of the surface of the workpiece 12 corresponds exactly to the objective focal length.

From the description given so far, it can be seen that when the scanning head 10 moves over the surface of the workpiece 12, the objective 24 travels axially as this corresponds to the surface profile of the work-piece 12. Due to position-measuring means co-operating with the objective ring 22 or by measuring the feed current for the toroidal coil 18 necessary for balancing, an electrical signal changing with the surface profile is thus produced. For the purposes of the present description it is assumed that this signal (possibly after correction for non-linearities in the drive system formed by the toroidal coil 18, the permanent magnet 20 and the leaf springs 26, 28) is derived from the magnitude of the toroidal coil feed current. This measuring signal is made available on a lead 54.

The scanning head described so far corresponds in its construction to scanning heads as they are used in CD-players for motor vehicles.

However, in the scanning head illustrated in FIG. 1, a device for the visual observation of the point of the work-piece surface measured is also provided by way of addition. For this purpose, the rear side of the glass backing member 40 is polished to optical quality. This can take place simply due to the fact that the deflecting mirror present in the commercially available CD-scanning head is removed from the housing 14 and is polished to optical quality on its rear side, whereupon the deflecting mirror 38 is then re-introduced into the housing 14.

The observation device designated generally by the reference numeral 56 has a housing 58, which defines a tube 60 and a lamp chamber 62. Located in the lamp chamber 62 is a halogen lamp 64, the coiled filament of which is focussed by way of a lens 66 on the end of a bent light guide 68. The latter penetrates the tube 60 and lies with its light guide section extending vertically downwards on the axis of the objective, thus also on the axis of the tube 60.

Inserted in the tube 60 is a tube lens 70, which may be a plastic lens. In order to achieve the lowest possible overall height of the total arrangement, the tube lens 70 may be drilled in the centre and the lower end of the light guide 68 may be guided therethrough, as shown in the drawing. An ocular lens 72 is inserted in the upper end of the tube 60.

The light emitted by the halogen lamp 64 passes by way of the light guide 68, through the deflecting mirror 38 and by way of the objective 24 to the work-piece surface, where it is focussed. The observation light reflected by the work-piece surface passes partly through the deflecting mirror 38 again and passes through the tube lens 70 and the ocular lens 72 into the eye of an observer. For this, the objective 24, the tube lens 70 and the ocular lens 72 form a microscope, through which details of the work-piece surface can be observed with magnification. The point of the work-piece surface observed in this way is exactly that which is also measured using the laser light.

Part of the observation light reflected by the work-piece surface also passes by way of the deflecting mirror 38 and the measuring mirror 36 to the transducer arrangement 44. This light could disturb the subsequent guidance of the objective 24 and thus the measurement of the work-piece surface, if the visual observation and the measurement take place simultaneously. In order to prevent this, the semi-conductor laser 34 is excited in pulses by an associated feed circuit 74 of the operating circuit 50 and the input amplifier 48 is constructed as a phase-sensitive rectifier, so that non-modulated portions of light, which likewise fall onto the transducer arrangement 44, do not impair subsequent adjustment of the objective position.

Figure 2:
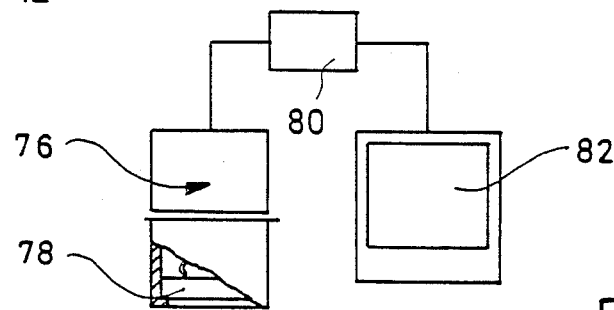
FIG. 2 is a diagrammatic view of a modified ocular insert with integrated image converter and a monitor connected thereto, for use with the scanning head according to FIG. 1.

FIG. 2 shows an ocular member 76, which can be inserted in the upper end of the tube 60 in place of the ocular lens 72. The ocular member 76 contains a solid state image converter 78 in such an axial position, as it is used in television cameras, that the real image of the work-piece surface produced by the tube lens 70 lies on the light-sensitive surface of the image converter 78. The image converter 78 is connected by way of camera electronics 80, which may correspond completely to the commercially available electronics of portable television cameras, to a monitor 82. On this monitor, the microscope image of the region of the work-piece surface just measured may thus be observed at the same time as measuring of the work-piece surface. This observation is thus conveniently possible, without there being any risk that when looking into the ocular, the observer accidentally comes into contact with the scanning head 10 and thus mechanically influences the very precisely predetermined path along which the scanning head is drawn over the work-piece surface. Furthermore, in this way, a convenient visual inspection of the work-piece surface is also possible if the scanning head operates in poorly accessible places, for example measures cylinder bores or the like.

Figure 3:
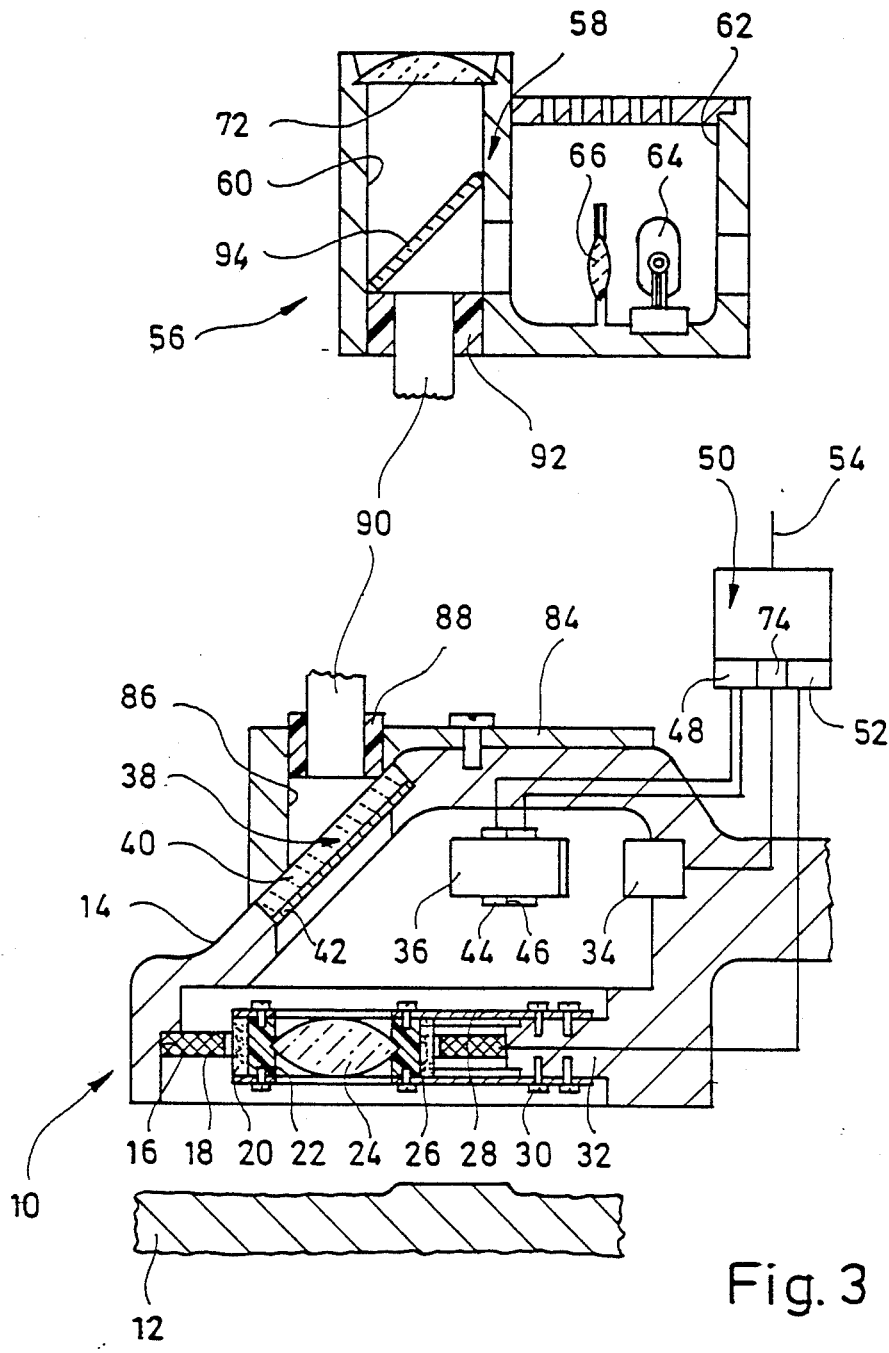
FIG. 3 is a similar sectional view to FIG. 1 through a modified scanning head.

In the embodiment according to FIG. 3, parts which have already been described above, are given the same reference numerals; they are not described in detail hereafter.

The housing 58 is separated from the housing 14 and in its place an adaptor plate 84 is screwed on, which defines a tube 86. Fixed in the latter by means of a resilient clamping sleeve 88 is one end of a flexible, coherent fiber cable 90. The latter comprises a plurality of glass or synthetic fibers bunched in an orderly manner and can thus transmit an image. The other end of the fiber cable 90 is fixed by a resilient clamping sleeve 92 in the lower end of the tube 60 of the housing 58.

Also inserted in the tube 60 is a mirror 94 which is semipermeable to the observation light, which mirror deflects the observation light produced by the halogen lamp 64 and converted by the lens 66 into a beam of parallel rays, into the fiber cable 90 and allows the light reflected back by the work-piece surface to travel to the ocular lens 72.

What is claimed is:

1. An optical surface scanning head which includes a measuring light source defining a light source axis, preferably a solid state laser, with an objective for focusing the measuring light source on a work-piece surface and having an objective axis which is inclined with respect to said light source axis and preferably intersects the latter at right angles, a deflecting mirror which is impermeable for the measuring light which is located at the intersection point of the objective axis and light source axis and has a light receiving front side and an opposing rear side, a measuring mirror which is semi-permeable for the measuring light and which is located between the measuring light source and the objective, preferably between the measuring light source and the deflecting mirror, a photoelectric transducer arrangement which is acted upon by the measuring light deflected by the measuring mirror returning from the work-piece surface and produces an output signal dependent on the incidence point of this measuring light, an adjusting device for axially moving the objective, a control circuit by which the adjusting device is actuated depending on the output signal of the transducer arrangement so that the output signal of the transducer arrangement assumes a given value, and means for producing a measuring signal corresponding to the objective position characterized in that the deflecting mirror (38) is permeable for at least one light wave length not contained in the measuring light spectrum and also has optical quality on its rear side, and in that an observation optical system (70, 72) is located behind the deflecting mirror (38).

2. A scanning surface head according to claim 1 characterized in that an illuminating device (64–78) makes available observation light with at least one wavelength not contained in the measuring light spectrum, on the axis of the objective (24).

3. A scanning surface head according to claim 2 characterized in that the illuminating device comprises an illuminating light source (64) located laterally beside the objective axis and means (68) for deflecting the observation light onto the objective axis, in particular a curved light guide (68).

4. A scanning head according to claim 1 characterized in that the measuring light source (34) produces modulated measuring light and the output signal of the transducer arrangement (44) is processed by a phase-sensitive rectifier (48).

5. A scanning head according to claim 1 characterized in that the observation optical system comprises a tube lens (70) and an ocular lens (72).

6. A scanning head according to claim 1 characterized in that the observation optical system comprises a tube lens (70) and a solid state image converter (78).

7. A scanning head according to claim 2 characterized in that the observation optical system (70, 72, 78) and optionally the illuminating device (64–78) are located in an additional housing (58) attached to the housing (14) of the scanning head.

8. A scanning head according to claim 1 characterized in that the observation optical system comprises a coherent fiber cable (90).

9. A scanning head according to claim 8 characterized by means (94) for introducing observation light (64) into the fiber cable (90).

* * * * *